US010653104B2

(12) United States Patent
Poort et al.

(10) Patent No.: US 10,653,104 B2
(45) Date of Patent: May 19, 2020

(54) LIGHTING DEVICE FOR USE IN LIGHTING OF CHEESE (71) Applicant: SIGNIFY HOLDING B.V., Eindhoven (NL)

(72) Inventors: Simone Helena Maria Poort, Veldhoven (NL); Anna Louise Bouwkamp-Wijnoltz, Nuenen (NL); Franz Engelen, Eindhoven (NL); Nicole Petronella Martien Haex, Waalre (NL); Cornelis Teunissen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/318,770

(22) PCT Filed: Jul. 12, 2017

(86) PCT No.: PCT/EP2017/067556
§ 371 (c)(1),
(2) Date: Jan. 18, 2019

(87) PCT Pub. No.: WO2018/015246
PCT Pub. Date: Jan. 25, 2018

(65) Prior Publication Data
US 2020/0022330 A1  Jan. 23, 2020

(30) Foreign Application Priority Data

Jul. 21, 2016 (EP) .................................... 16180609

(51) Int. Cl.
*A01J 25/16* (2006.01)
*H05B 33/08* (2020.01)
(Continued)

(52) U.S. Cl.
CPC ............. *A01J 25/165* (2013.01); *A47F 3/001* (2013.01); *H05B 33/086* (2013.01); *F21W 2131/405* (2013.01)

(58) Field of Classification Search
None
See application file for complete search history.

(56) References Cited

U.S. PATENT DOCUMENTS 6,098,529 A * 8/2000 Brummett ............ A21C 15/002
219/214
8,132,939 B2 3/2012 Platzer et al.
(Continued)

FOREIGN PATENT DOCUMENTS

EP 0403137 A2 12/1990
EP 2823224 B1 1/2015
(Continued)

OTHER PUBLICATIONS

Pettersen, M.K. et al, "Oxidative Stability of Cream Cheese stored in thermoformed trays as affected by packaging material, drawing depth and light", International Diary Journal, Elsevier Applied Science, Barking, GB, vol. 15, No. 4, Apr. 1, 2005, pp. 355-362.
(Continued)

*Primary Examiner* — Crystal L Hammond
(74) *Attorney, Agent, or Firm* — Daniel J. Piotrowski (57) ABSTRACT The invention provides a method of selecting the suitability of a lighting device (100) for use in cheese lighting, the method comprising (a) defining a normalization factor (k) for a spectral power distribution (SPD($\lambda$)) of lighting device light (101) of said lighting device (100) in a wavelength range of 380-780 nm, (b) defining the lighting device (100) suitable for use in cheese lighting when a cheese damage function value (CDFV) is equal to or below 2, wherein the
(Continued)

cheese damage function value (CDFV) is defined as: (I) wherein: (II) wherein $\bar{y}(\lambda)$ is a 2-degree color matching function, and wherein $DF(\lambda)=1$ for 380 nm$\leq \lambda <$410, and wherein for 410$\leq \lambda \leq$780: (III).

$$CDFV = k \times \sum_{\lambda} SPD(\lambda) \cdot DF(\lambda) \cdot \Delta\lambda \quad (\text{I})$$

$$k = \frac{100}{\sum_{\lambda} SPD(\lambda) \cdot \bar{y}(\lambda) \cdot \Delta\lambda} \quad (\text{II})$$

$$DF(\lambda) = 0.95 \times e^{-\left(\frac{\lambda-410}{22}\right)^2} + 0.05 \times e^{-\left(\frac{\lambda-410}{105}\right)^2} \quad (\text{III})$$

15 Claims, 5 Drawing Sheets

(51) Int. Cl.
    *A47F 3/00* (2006.01)
    *F21W 131/405* (2006.01)

(56) References Cited

U.S. PATENT DOCUMENTS

| | | | |
|---|---|---|---|
| 2003/0000935 A1* | 1/2003 | Roehr | A47F 3/001 219/385 |
| 2003/0007150 A1* | 1/2003 | O'Keeffe | G01N 15/0205 356/338 |
| 2009/0299154 A1* | 12/2009 | Segman | A61B 5/0059 600/301 |
| 2016/0257476 A1* | 9/2016 | Wilmers | B65D 85/72 |
| 2017/0227511 A1* | 8/2017 | Gu | G01N 33/04 |
| 2018/0085003 A1* | 3/2018 | Goldring | A61B 5/0022 |
| 2018/0127150 A1* | 5/2018 | Adanur | A47B 57/10 |
| 2018/0184972 A1* | 7/2018 | Carmi | A61B 5/725 |

FOREIGN PATENT DOCUMENTS

| | | |
|---|---|---|
| WO | 2011152879 A1 | 12/2011 |
| WO | 2012020081 A1 | 2/2012 |
| WO | 2015134630 A1 | 9/2015 |

OTHER PUBLICATIONS

Natthorn Intawiat et al, "Effect of different wavelength of light on the formation of photo-oxidation in Gouda-like cheese", International Dairy Journal, Elsevier Applied Science, Barking, GB, vol. 21, No. 8, Mar. 15, 2011, pp. 531-539.

Charlotte M. Andersen et al, "Wavelength Dependence of Lighting-Induced Lipid Oxidation and Naturally Occurring Photosensitizers in Cheese", Journal of Agricultural and Food Chemistry, vol. 56, No. 5, Mar. 1, 2008, pp. 1611-1618.

D. Daly et al, Hal, "Pink discolouration defect in commercial cheese: a review", https://hal.archives-ouvertes.fr/hal-00930643.

Jens Petter Wold et al, "Influence of storage time and color of light on photooxidation in cheese: A study based on sensory analysis and fluorescence spectroscopy", International Dairy Journal, Elsevier, vol. 16, 2006, pp. 1218-1226.

Dorthe Kristensen et al, "Influence of light and temperature on the colour and oxidative stability of processed cheese", International Dairy Journal, vol. 11, Issue 10, 2001, pp. 837-843.

Grith Mortensen et al, "Light-induced changes in packaged cheeses—a review", Elsevier, International Diary Journal, No. 14, (2004), pp. 85-102.

\* cited by examiner

LIGHTING DEVICE FOR USE IN LIGHTING OF CHEESE

CROSS-REFERENCE TO PRIOR APPLICATIONS

This application is the U.S. National Phase application under 35 U.S.C. § 371 of International Application No. PCT/EP2017/067556, filed on Jul. 12, 2017 which claims the benefit of European Patent Application No. 16180609.6, filed on Jul. 21, 2016. These applications are hereby incorporated by reference herein.

FIELD OF THE INVENTION

The invention relates to a method of selecting the suitability of a lighting device for a specific application. The invention further relates to a method of lighting a food product as well as to a method of handling a food product. Yet further, the invention relates to a specific lighting device as well as to a system including such lighting device.

BACKGROUND OF THE INVENTION

Lighting devices with a specific spectral power distribution for application in e.g. food markets are known in the art. U.S. Pat. No. 8,132,939, for instance, describes the generation of an application-specific reddish or yellowish or greenish light, especially for applications in markets, e.g. food markets, with blue LEDs in association with color conversion using luminous materials. Similarly to the case of white-light generation, a blue LED with a wavelength of e.g. about 460 nm is encapsulated with the luminous material (luminous material with downward conversion of the blue light), to stimulate a color conversion. The luminous material converts part of the blue light from an LED chip into, for instance, red and/or yellow and/or green light. In particular, a luminous materials mixture, i.e. at least two different luminous materials, can be used for this purpose. In this way a special spectrum is represented, for presentation of goods in the food market with LEDs, a "white" light with a high red or yellow or green portion being generated with blue LEDs and luminous material(s).

Pettersen M K et al: "Oxidative stability of cream cheese stored in thermoformed trays as affected by packaging material, drawing depth and light", International dairy journal, Elsevier Applied Science, Barking, G B, vol. 15, no. 4, 1 Apr. 2005 (2005 Apr. 1), pages 355-362 describes that the oxidative stability of cream cheese stored in thermoformed trays made of amorphous polyethylene terephthalate (A-PET)/polyethylene (PE), polystyrene (PS)/Ethylene-vinylalcohol copolymer (EVOH)/PE and Polypropylene (PP)/PE with different depth (25, 50 and 70 mm) and color (black, white and transparent) was studied by sensory evaluation and gas chromatographic analysis of volatile compounds. The polymer combination had an important effect on sensory scores of both sunlight and acidulous flavor in cream cheese stored in the dark for 2, 4 and 6 months. Cream cheese stored in trays made of A-PET/PE had higher acidulous flavor and lower content of hexanal and 2-nonanone. Only small differences were observed between PS/EVOH/PE and PP/PE despite the great diversity of oxygen transmission rates. The drawing depth of the packages had no significant effect on oxidative stability of cream cheese, irrespective of storage in the dark or under illumination. The color of the examined packaging material had a pronounced effect on photoxidative changes in cream cheese.

WO 2011/152879 describes solid state light sources, lighting devices and lamps arranged to provide emission with a warm temperature and high CRI. One embodiment of a solid state lighting device according to the present invention comprises a light emitting diode (LED) device capable of emitting light in an emission spectrum. A filter arranged so that at least some light from the LED light source passes through it, with the filter filtering at least some of one or more portions of the light source emission spectrum. The resulting light source light has a different temperature but substantially the same CRI after passing through the filter.

WO 2015/134630 describes that related to most light-emitting devices, such as LED luminaires, a filtering, beam-shaping optic that controls the spectral content of the emitted light and the shape of the emitted beam. One or more filtering agents are mixed with a non-filtering material used for making an optic and the optic is then formed into a desired shape or configuration to control the beam shape. Light waves in a subrange of the overall wavelength range emitted from the light source are shifted to control the spectral content of the emitted light. Spectral density of the emitted light for various wavelengths is controlled to achieve a desired result, such as minimizing the amount of blue light emitted from outdoor lighting devices, particularly at night. Further, the color content of light emitted is controlled, for example, to minimize damaging effects to light-sensitive objects such as food products, certain art materials, etc.

WO 2012/020081 describes an illumination arrangement having a lamp with a plurality of light sources, which emit light in each case of a different color, and a control unit for operating the light sources, wherein the control unit is configured to change the spectral composition of the light emitted with substantially unchanged color locus and/or unchanged color temperature, once a user has fixed a desired color locus and/or color temperature for the light emission.

Natthorn Intawiwat et al: "Effect of different wavelength of light on the formation of photo-oxidation in Gouda-like cheese", International Dairy Journal, Elsevier Applied Science, Barking, G B, vol. 21, no. 8, 15 Mar. 2011 (2011 Mar. 15), pages 531-539, describes that Norvegia cheese samples were packed in air and nitrogen atmospheres and exposed to light of different colors, blue (350-560 nm), green (450-620 nm) and red (580-700 nm). After 7 days of light exposure, each cheese was sliced, from the exposure surface and down, into eight slices of 3 mm thickness. The slices were analyzed by sensory analysis and fluorescence spectroscopy, enabling studies of how photo-oxidation progressed as a function of depth of the cheese. Green light gave the most oxidation at the surface for air stored samples. Oxidized flavors at depths down to 9 mm were more intense for exposure to red and green light. Blue light degraded riboflavin in the two upper layers (0-6 mm), whereas red and green light affected hematoporphyrin, protoporphyrin IX and chlorophyll as far as 21 mm into the cheese. The results suggest that tetrapyrroles are responsible for photo-oxidation at the surface and the interior of the cheese.

Charlotte m. Andersen et al: "Wavelength Dependence of Light-Induced Lipid Oxidation and Naturally Occurring Photosensitizers in Cheese", Journal Of Agricultural And Food Chemistry, vol. 56, no. 5, 1 Mar. 2008 (2008 Mar. 1), pages 1611-1618, describes that the Degradation of the potential photosensitizers, riboflavin, chlorophyll, and porphyrin, in Danbo cheese by monochromatic light of wavelength 366, 436, or 546 nm was studied. Three cheeses were investigated, two conventional (16% fat and 25% fat) and one "organic" (25% fat). The effect of illumination was measured by fluorescence spectroscopy and analyzed using multiway and multivariate data analysis. Riboflavin was found to degrade only by 436 nm light, whereas chlorophylls and porphyrins also were influenced by 436 and 546 nm light. The organic cheese had the largest chlorophyll content both before and after similar light exposure, and no change in chlorophyll of this cheese was observed for any of the illumination wavelengths. Upon light exposure of the cheeses, volatile compounds were formed, as analyzed by gas chromatography-mass spectrometry (GC-MS). The relative concentrations of methyl butanoate, 1-pentanol, benzaldehyde, 2-butanone, 2-heptanone, and butyl acetate were found to weakly correlate with the surface fluorescence intensity. 1-Pentanol and the ketones are secondary lipid oxidation products, consistent with a chemical coupling between photosensitizer degradation and formation of volatile lipid oxidation products.

SUMMARY OF THE INVENTION

Light-induced degradation of lipids causes both formation of off-flavors and color changes, which rapidly impair product quality and marketability of e.g. meat, cheese, nuts, vegetable oil and other lipid containing products. To diminish light-induced lipid oxidation, there are different factors protecting the food, like for example absorption and reflection of the packaging material, product absorption and reflection, and gas composition in the package and intensity and spectrum of the light. To prevent lipid oxidation of fresh and packaged food, the intensity and spectrum of the lamps which are used are important parameters which can be influenced directly by the supermarket. Nowadays, the conventional white sodium vapor lamps (SON lamps) are often used in fresh food areas in supermarkets.

Hence, it is an aspect of the invention to provide an alternative lighting device, which preferably further at least partly obviates one or more of above-described drawbacks. It is also an aspect of the invention to provide an alternative lighting method, which preferably further at least partly obviates one or more of above-described drawbacks. Yet further, it is an aspect to provide a method of selecting a suitable lighting device for use in food lighting, especially in cheese lighting. The present invention may have as object to overcome or ameliorate at least one of the disadvantages of the prior art, or to provide a useful alternative.

Lipid oxidation of cheese is a problem for supermarkets because product quality and marketability deteriorate rapidly. It appeared that there is a clear effect of light on flavor and taste of cheese: lit samples are described by test panels as more sour and rancid.

A plurality of white spectra and specific parts of the visible spectrum were investigated. For a plurality of different light sources the influence of the light of the light sources on cheese was evaluated. This led to the surprising finding that a spectral condition could be defined which, when complied with provides light that is substantially not detrimental to the cheese, and which, when not complied with, appears to be detrimental to the cheese in the sense of discoloration and/or taste degradation. A cheese damage function is calculated based on the results.

Hence, in a first aspect the invention a method of selecting the suitability of a lighting device ("device") for use in food lighting, especially cheese lighting, the method comprising (a) defining a normalization factor (k) for a spectral power distribution (SPD($\lambda$)) of lighting device light (herein also indicated as "light" or "cheese light" or "cheese lighting") of said lighting device in a wavelength range of 380-780 nm ("visible light") with a cheese damage function (DF) to provide a wavelength dependent function, (b) defining the lighting device suitable for use in cheese lighting when a cheese damage function value (CDFV) is equal to or below 2, wherein the cheese damage function value (CDFV) is defined as:

$$CDFV = k \times \sum_{\lambda} SPD(\lambda) \cdot DF(\lambda) \cdot \Delta\lambda$$

wherein:

$$k = \frac{100}{\sum_{\lambda} SPD(\lambda) \cdot \bar{y}(\lambda) \cdot \Delta\lambda}$$

wherein $\bar{y}(\lambda)$ is a 2-degree color matching function, and wherein DF($\lambda$)=1 for 380 nm$\leq\lambda<$410, and wherein for 410$\leq\lambda\leq$780:

$$DF(\lambda) = 0.95 \times e^{-\left(\frac{\lambda-410}{22}\right)^2} + 0.05 \times e^{-\left(\frac{\lambda-410}{105}\right)^2}.$$

In yet a further aspect, the invention also provides a lighting device configured to provide lighting device light having a cheese damage function value (CDFV) equal to or below 2, wherein the cheese damage function value (CDFV) is obtained by (a) defining a normalization factor (k) for a spectral power distribution (SPD($\lambda$)) of lighting device light (101) of said lighting device (100) in a wavelength range of 380-780 nm, (b) defining the lighting device (100) suitable for use in cheese lighting when a cheese damage function value (CDFV) is equal to or below 2, wherein the cheese damage function value (CDFV) is defined as:

$$CDFV = k \times \sum_{\lambda} SPD(\lambda) \cdot DF(\lambda) \cdot \Delta\lambda$$

wherein:

$$k = \frac{100}{\sum_{\lambda} SPD(\lambda) \cdot \bar{y}(\lambda) \cdot \Delta\lambda}$$

wherein $\bar{y}(\lambda)$ is a 2-degree color matching function, and wherein DF($\lambda$)=1 for 380 nm$\leq\lambda<$410, and wherein for 410$\leq\lambda\leq$780:

$$DF(\lambda) = 0.95 \times e^{-\left(\frac{\lambda-410}{22}\right)^2} + 0.05 \times e^{-\left(\frac{\lambda-410}{105}\right)^2}.$$

Hence, with the above damage function and cheese damage function value it can (now) be concluded whether or not the lighting device, more especially its light, is suitable for use in lighting of cheese or lighting conditions wherein cheese is subjected to, such as in storage or in a super market, etc. . . . Such check of the light of the lighting device for its suitability for use in food lighting, especially cheese lighting, may be beneficial in choosing the lighting devices being used when the cheese is produced, such as during storage, during transport, or in the supermarket, etc. . . . The result of the method of selecting the suitability of a lighting device may be a lighting device considered suitable of lighting of cheese. Hence, the invention also relates to a lighting device having a CDFV equal to or lower than 2 obtainable with the method of selecting the suitability of a lighting device.

Further, with the damage function one may tune the spectral power distribution of the lighting device light during design and/or production of the lighting device to provide the desired spectral power distribution complying with the herein indicated CDFV. Yet further, when using tunable lighting devices, such lighting devices may be provided with one or more settings complying with the herein indicated CDFV.

The cheese damage function was found after extensive research of a plurality of different spectral power distributions of light on the properties of cheese. Light complying with the herein indicated CDFV may be beneficial to other types of food as well. Hence, the invention is not limited to applications in cheese lighting only; neither is the herein described device (or system) limited to such use. However, the light with the herein indicated CDFV is especially useful in the lighting (or herein also indicated as illumination) of cheese, and is described in relation to this specific application.

To use the cheese damage function, the spectral power distribution of a lighting device or (a possible) target spectral power distribution (such as during design of a lighting device) is provided. The spectral power distribution is a plot or table with the intensity of the light (in energy units) as function of the wavelength, especially in steps of 1 nm. The relevant spectral range is the visible, i.e. 380-780 nm. The spectral power distribution may be normalized with the normalization factor k, and the CDFV value is defined by integrating the product of the spectral power distribution and the damage function within the range of 380-780 nm and multiplying with the normalization factor. In such instance, the CDFV should be 2 or lower. The SPD shall be normalized to obtain a Y-tristimulus value of 100, where XYZ tristimulus values are computed with the 2-degree color-matching function $\bar{y}(\lambda)$ known in the art. The 2-degree color-matching function $\bar{y}(\lambda)$ is defined in CIE 015-2004, $3^{rd}$ edition—Colorimetry (Section 11.4 Table T.4. CIE 1931 standard colorimetric observer).

In the first part of the spectrum, i.e. up to and including 410, i.e. 370-410 the value for DF is chosen as 1. At higher wavelengths, the herein described function is followed and used as factor to multiply the values of the spectral power distribution. Hence, the method includes multiplying a spectral power distribution of lighting device light of said lighting device in a wavelength range of 380-780 nm ("visible light") with a cheese damage function (DF) to provide a wavelength dependent function.

Then, in an evaluation stage and it is defined whether the lighting device suitable for use in cheese lighting when the cheese damage function value (CDFV) is equal to or below 2, or defining the lighting device not suitable for use in cheese lighting when the cheese damage function value (CDFV) is above 2.

Would the lighting device also provide radiation with a wavelength smaller than 380 nm, the contribution of the radiation having a wavelength smaller than 380 nm in Watt is especially less than 10% of the total contribution of the radiation in the wavelength range of 380-780 nm, such as less than 5%, like less than 2%, such as 0-1%. Likewise, would the lighting device also provide radiation with a wavelength larger than 380 nm, the contribution of the radiation having a wavelength larger than 780 nm in Watt is especially less than 20% of the total contribution of the radiation in the wavelength range of 380-780 nm, such as less than 10%, like less than 5%, like less than 2%, such as 0-1%. Hence, assuming x Watt in the range of 380-780 nm, there may be by way of example an additional 0-0.02*x Watt in the wavelength range below 380 nm (assuming the range of 0-2% in this example).

Especially, the lighting device light is white light. The term white light herein, is known to the person skilled in the art. It especially relates to light having a correlated color temperature (CCT) between about 2000 and 20000 K, and especially within about 15 SDCM (standard deviation of color matching) from the BBL (black body locus), especially within about 10 SDCM from the BBL, even more especially within about 5 SDCM from the BBL. It further appears that good cheese lighting can be obtained with desirable lighting properties can be obtained while still being white light. However, too high color temperatures seem less desirable. Hence, in a specific embodiment, the lighting device light has a correlated color temperature (CCT) selected from the range of 2200-3000 K, such as at least 2400 K. Further, especially the lighting device light has a general color rendering index ($R_a$) of at least 80, even more especially at least 90. The general color rendering index ($R_a$) is defined in CIE 13.3:1995 "Method of measuring and specifying color rendering properties of light sources". The general color rendering index ($R_a$) is often also indicated as "color rendering index" or "$R_a$". As indicated above, the invention also provides a lighting device. Hence, in further specific embodiments the lighting device is configured to provide lighting device light having a correlated color temperature (CCT) selected from the range of 2200-3000 K and/or a general color rendering index ($R_a$) of at least 80, even more especially at least 90.

Further, especially the cheese damage function value (CDFV) is selected from the range of up to 2, such as 0.1-2, even more especially 0.2-1.9, such as 0.5-0.9, like 1-1.9.

The above indicated CDFV condition can thus be used to select lighting devices and/or to control the properties of the lighting devices, including controlling the production of the lighting devices in order to provide such devices that do provide such lighting or are able to provide such lighting.

Hence, in yet a further aspect the invention also provides a method of lighting cheese, the method comprising illuminating said cheese with lighting device light having a cheese damage function value (CDFV) as defined herein of equal to or below 2. Specific embodiments described herein in relation to the method of selected the suitability of a lighting device, or in relation to the lighting device or lighting system, etc., may also apply in relation to the method of lighting cheese. The cheese may substantially only be illuminated with the cheese lighting. It appears that best results in terms of taste and/or color may be obtained when the cheese is kept in the dark or illuminated with the lighting device light as described herein (see also below). Hence, in embodiments at least 80% of a total energy provided as visible light to said cheese consists of said lighting device light, even more especially at least 90%, such as even more especially at least 95% of a total energy provided as visible light to said cheese, consists of said lighting device light. Hence, in embodiments only a relatively small part of the light provided to the cheese may be from other sources. Therefore, the phrase "method of lighting cheese" especially indicates providing said lighting device light complying with the CDFV value as defined herein to said cheese, and especially indicates that essentially all light received by said cheese complies with the CDFV value, such as at least 80% of a total energy provided as visible light to said cheese consists of said lighting device light. Hence, in embodiments the cheese may essentially only be illuminated with the lighting device light of the lighting device as described herein.

The invention especially appears to be suitable for use in lighting of a semi-hard or hard cheese. The cheese is preferably selected from the group consisting of Gouda, Edam, Tilsit, Gruyere, Cheddar, Emmental and Maasdam. However, other cheese types may also be possible, such as soft cheeses or semi-soft cheeses. In embodiments, the cheese may be goat cheese, sheep milk cheese, etc.

The method of method of lighting cheese may especially comprise illuminating said cheese with said lighting device light while the cheese is contained in refrigerated display equipment. Hence, in embodiments the method and/or lighting device and/or lighting system may especially be applied in a shop, especially in a super market. Note that the term "supermarket" may also refer to a "hypermarket" or a "big-box market". Alternatively or additionally, the method of lighting cheese may especially comprise illuminating said cheese with said lighting device light while the cheese is being (further) processed, for instance to provide one or more of packaged cheese, cheese parts (such as cheese cubes), cheese slices, and grated cheese, etc. . . . Hence, the method of lighting cheese may amongst others be applied during ripening of the cheese, storage of the cheese, processing of the cheese, transport of the cheese, and display (or exposure) of the cheese (in a shop, such as a super market, etc.).

The food lighting, more especially cheese lighting, may be used during the entire chain from the time the cheese is provided until delivery of the cheese to an end user. As already indicated above, especially during substantially this entire chain, the cheese is subject to either dark or the herein described cheese lighting. As sometimes lighting is necessary, at least part of the time period there between production and transport, or even beyond, such as even substantially until delivery to an end user, is subjected to substantially only the herein described lighting device light complying with the herein defined cheese damage value (of 2 or smaller).

Therefore, in yet a further aspect the invention also provides a cheese logistics method comprising one or more stages of (i) production of the cheese, (ii) ripening of the cheese, (iii) packaging of the cheese, (iv) storage of the cheese, (v) processing of the cheese, and (vi) exposure of the cheese, the method comprising subjecting the cheese during at least 80% of a time period during one or more stages of said one or more stages to the substantial absence of light or to illumination with lighting device light having a cheese damage function value (CDFV) as defined herein of equal to or below 2. The term "logistics" generally refers to the detailed organization and implementation of a complex operation. In a general business sense, logistics is the management of the flow of things between the point of origin and the point of consumption in order to meet requirements of customers or corporations. The resources managed in logistics can include physical items such as food, materials, animals, equipment, and liquids; as well as abstract items, such as time and information. The logistics of physical items usually involves the integration of information flow, material handling, production, packaging, inventory, transportation, warehousing, and often security. Especially, the cheese logistics method comprises the stage from the time the cheese is provided as cheese, such as a curd that is stored for ripening. The cheese logistics method does not necessarily include all stages of production until providing the cheese, but at least one or more stages from providing the cheese, i.e. the stage of provide the cheese and the stage of transporting the cheese. Hence, from about the moment the cheese is provided as cheese until and including the transport of the (ripened) cheese to another location, such as a super market, the cheese is either in the dark or subjected to the lighting device light. Less than 20% of the time, such as less than 10% of the time, even more less than 5% of the time the cheese may be subjected to other lighting conditions, including day light. Other lighting conditions especially include visible light having a cheese damage function value (CDFV) over 2. Herein the term "cheese logistics method" is applied as the method may amongst others (thus) also include the control of the lighting of the cheese during one or more stages from production until and including transport or even also other stages (see also below). In yet further embodiments, the cheese logistics method may include two or more of the above mentioned stage, such as all stages, and during only a subset of these stages, such as a critical stage wherein the cheese may degrade due to undesired lighting, the cheese is subjected during at least 80% of the time period during the subset of these stages of said one or more stages to the substantial absence of light or to illumination with lighting device light having a cheese damage function value (CDFV) as defined herein of equal to or below 2. The term "subset of these stages" and similar terms indicate one or more stages, but less than the total number of stages comprised by the cheese logistics method.

In specific embodiments, the method may comprise subjecting the cheese during one or more stages to the illumination with lighting device light having a cheese damage function value (CDFV) as defined herein of equal to or below 2, especially wherein at least 5% of the time of such (respective) state(s) the cheese is subjected to the lighting device light.

When the cheese is provided as cheese, a ripening stage may be necessary to provide a cheese that can be used as commonly known food product. Ripening may also include foil ripening. Hence, in embodiments the cheese logistics method may (also) include a ripening stage (just after providing the cheese; which may in that stage substantially be a curd). Further, after ripening the cheese may be (temporarily) stored, such as in a (temperature-conditioned) storage. Hence, in embodiments the cheese logistics method may also include a storage stage. Therefore, in yet further embodiments the time period also includes one or more of a ripening stage of the cheese and a storage stage of the cheese.

Further, the lighting device light as defined herein may be used for lighting in a production area, etc. Hence, the cheese logistics method may (also) include a production stage and/or a processing stage. During at least 80% of the time period during one or more of these stages the cheese may be submitted to the substantial absence of light or to illumination with lighting device light having a cheese damage function value (CDFV) as defined herein of equal to or below 2.

Yet further, the lighting device light as defined herein may be used for lighting in a shop, such as warehouse, etc. Especially, the cheese in a shop may be exposed to lighting. Even more especially, the cheese may not be packaged, thereby being even more vulnerable to the detrimental aspects of some lighting. Hence, the cheese logistics method may (also) include an exposure stage. During at least 80% of the time period during the stages the cheese may be submitted to the substantial absence of light or to illumination with lighting device light having a cheese damage function value (CDFV) as defined herein of equal to or below 2, even more especially to the lighting device light as defined herein. This stage may thus especially include display in a refrigerated display equipment. Further, during part of this stage, especially during the entire stage, the cheese may be unpackaged. For instance, this stage may start with providing said cheese (unpackaged) in a refrigerated display equipment, and may end with removing said cheese from the refrigerated display equipment. A refrigerated display equipment may especially relate to a device including a cooling function, such as configured to cool a content, such e.g. as the cheese, of the refrigerated display equipment to a temperature below ambient, such as below 20° C., like below about 15° C., like in the range of −20-20° C., like in the range of about 2-15° C., such as 2-10° C., like especially below about 8° C. Hence, the cheese logistics method may e.g. also include the stage that the cheese is offered for sale. Therefore, in yet further embodiments the method comprising illuminating said cheese with said lighting device light while the cheese is contained in a refrigerated display equipment. For instance, such refrigerated display equipment may include a lighting device as described herein, configured to illuminate the products displayed therein with the lighting device light.

Hence, in yet a further aspect the invention also provides a system comprising (i) a refrigerated display equipment comprising a display part for displaying food, especially cheese, and (ii) a lighting device as described herein configured to illuminate the display part. As indicated above, the lighting device may be comprised by the refrigerated display equipment. Alternatively or additionally, an area wherein the refrigerated display equipment is configured may include one or more lighting devices for lighting such area, wherein the one or more lighting devices are configured to provide the lighting device light complying with the herein indicated CDFV.

Yet further, the lighting device light as defined herein may be used for lighting in a restaurant, including a food court, etc. etc.

Different lighting devices may be able to provide the lighting device light complying with the herein indicated CDFV. Hence, in embodiments the lighting device is configured to generate the herein indicated lighting device light, and may have essentially only a tunability in intensity (of the lighting device light)(including in embodiments only the "on" and "off" function). In yet other embodiments, the lighting device as described herein may refer to a lighting device configured to provide lighting device light with a variable spectral power distribution, wherein the lighting device has at least one setting wherein lighting device light is provided having the herein defined CDFV of 2 or lower. Such lighting device may include a cheese lighting option.

In embodiments the lighting device comprises a first light source configured to provide first light source light having a correlated color temperature (CCT) selected from the range of 1800-2200 K, and a second light source configured to provide second light source light having a dominant wavelength in the green spectral region.

In embodiments, the lighting device is configured to provide lighting device having 3-7 emission bands, like 3-5, in the visible, having (at least) maxima in the range of 430-490 nm, 510-570 nm, 580-605 nm, and 610-680 nm. Each band has a full width half maximum width of at least 10 nm, such as in the range of 10-200 nm. In embodiments, the lighting device is configured to provide lighting device light having 3-5 emission bands, especially 3 emission bands, having (at least) maxima in the range of 440-480 nm, 510-540 nm, and 610-650 nm, like substantially only three band with maxima at about 450 nm+/−10 nm, 520 nm+/−10 nm, and 620 nm+/−10 nm.

In embodiments, the lighting device is configured to provide lighting device light having a spectral power distribution with at least two main bands, especially providing intensity in the entire spectral region of 440-740 nm. In further specific embodiments, the lighting device light especially has a first emission band having a first maximum in the range of 450-470 nm, a local minimum in the spectral range of 470-500 nm, and a second emission band having second maximum in the range of 600-620 nm. Especially, in such embodiments the first maximum has a peak height of less than 50% and more than 20% of a peak height of the second maximum. Further, especially in such embodiments the second band has a bandwidth in the range of 100-170 nm. Yet further, especially in such embodiments the local minimum has a minimum intensity in the range of 50-90% of the first maximum, such as at least 55%, like at least 60%. In embodiments, one or more of both main bands may each independently be composed of two or more bands.

Figure 6:
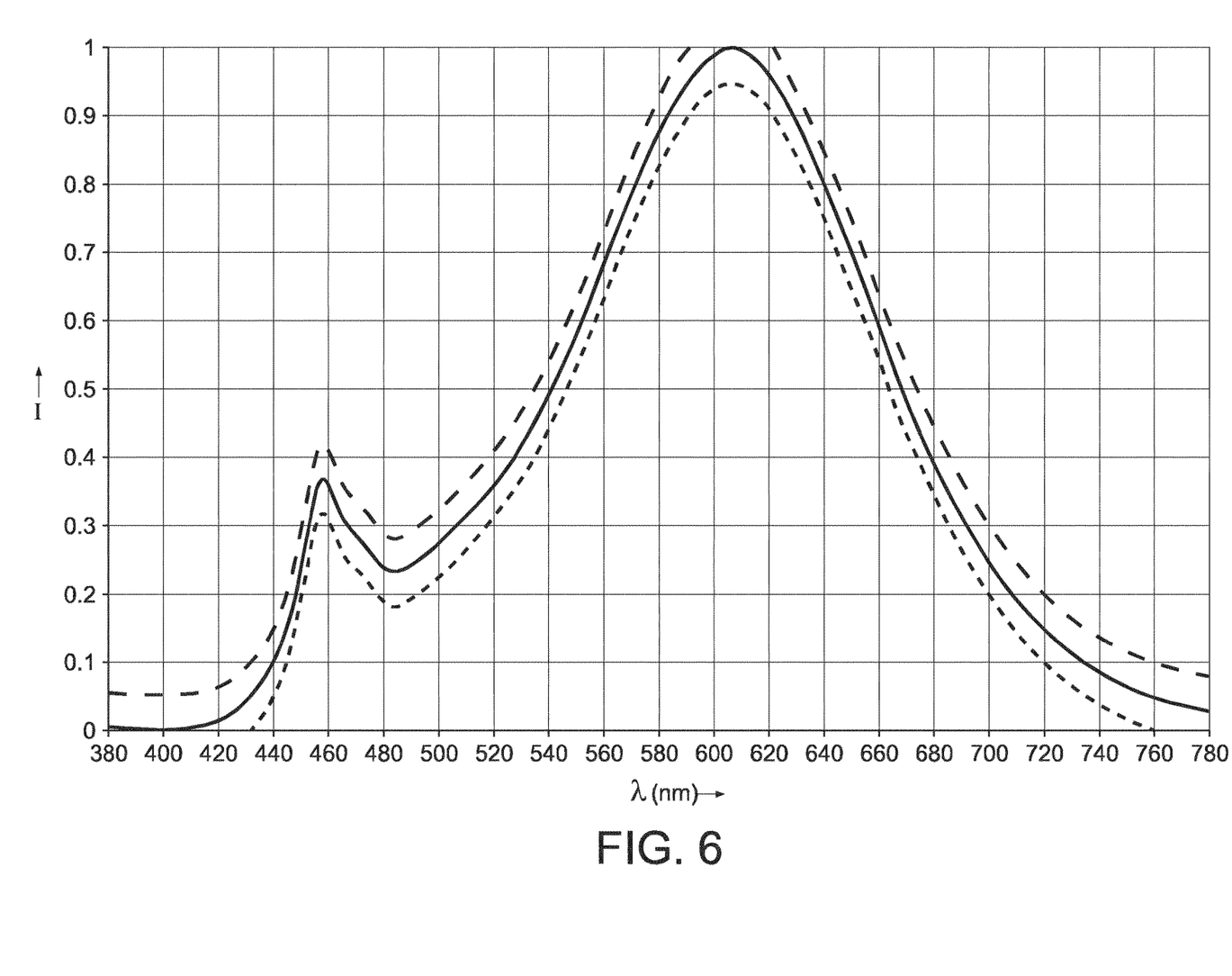
FIG. 6 shows the spectral distribution of a suitable lighting device, with on the y-axis the intensity on an energy scale (Watt, scaled to 1).

In embodiments, the lighting device light has a spectral distribution essentially identical to the spectral distribution displayed in FIG. 6. In yet further embodiments, the lighting device light has a spectral distribution that may deviate in intensity from the spectral distribution displayed in FIG. 6 with at maximum +/−10% of the maximum intensity, especially at maximum +/−5% of the maximum intensity, such as at maximum +/−2% of the maximum intensity. This implies, that relative to the spectral distribution displayed in FIG. 6, an upper curve following the spectral distribution can be displayed which is at maximum e.g. the above mentioned 10%, i.e. 0.1 above the displayed spectral distribution, and a lower curve following the spectral distribution can be displayed, which is at maximum e.g. the above mentioned 10%, i.e. 0.1 below the displayed spectral distribution. The spectral of a suitable spectral light distribution can differ from the displayed spectral distribution between the upper curve and the lower curve. In embodiments, the lighting device light has a spectral distribution essentially identical to spectral distribution obtainable on the basis of table 2 (see below). In yet further embodiments, the lighting device light has a spectral distribution that may deviate in intensity from the intensities indicated in the table 2 with at maximum +/−10% of the maximum intensity, especially at maximum +/−5% of the maximum intensity, such as at maximum +/−2% of the maximum intensity.

Especially, one or more of color point, correlated color temperature, CRI (herein also indicated as $R_a$), etc. each independently do not differ more than 5% of the color point, correlated color temperature, CRI associated with the spectral distribution displayed in FIG. 6 (or the spectral distribution obtainable on the basis of table 2), such as each independently differing not more than 2%. Especially, the damage function factor is not larger than 2.

Especially, in embodiments the lighting device light has a color rendering index ($R_a$) of at least 80, such as selected from the range of at least 82, a correlated color temperature selected from the range of 2500-2800 K, such as selected from the range of 2550-2750 K, like in the range of 2600-2700 K, and a color point of x=0.4656±0.07, y=0.4146±0.07, such as x=0.4656±0.05, y=0.4146±0.05, like especially x=0.4656±0.02, y=0.4146±0.02; especially, when alternative spectral compositions are applied, one or more of color point, correlated color temperature, CRI (herein also indicated as $R_a$), etc. each independently do not differ more than 5% of the color point, correlated color temperature, CRI as indicated, such as each independently differing not more than 2%.

Hence, in embodiments the lighting device light has a spectral distribution, when normalized to 1, as defined in FIG. 6 or deviates in intensity thereof with at maximum 5% of the highest intensity, such as at maximum 2%. Of course, a deviation with at maximum 5% etc., cannot be lower than zero intensity. A deviation with at maximum 5% etc. effectively implies a possible shift of the peak maximum within the range of 590-623 nm (see FIG. 6). Hence, the spectral distribution in the embodiment of at maximum 5% deviation will be within the two dashed lines.

The lighting device may include one or more light sources. Further, the lighting device may include one or more light converter materials.

In a specific embodiment, the light source comprises a solid state light source (such as a LED or laser diode). The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light semiconductor light source may be configured on the same substrate. In embodiments, a COB is a multi LED chip configured together as a single lighting module.

In embodiments, the lighting device comprises a first luminescent material configured to convert part of the blue light into first luminescent material light having intensity in one or more of the green and yellow. The first luminescent material may provide also light intensity in other spectral regions upon excitation by the light source. Especially however, the spectral distribution of the first luminescent material light is especially in the green and/or yellow, even more especially in the green. As indicated above, the term "first luminescent material" may also refer to a plurality of different luminescent materials, having different spectral distributions contributing to the first luminescent material light. Especially, the first luminescent material is configured to provide a spectral distribution with at least 80% of the power in the spectral region of 470-650 nm and more specific in the range of 485-630 nm.

Especially, the first luminescent material may comprise $M_3A_5O_{12}$:$Ce^{3+}$, wherein M is selected from the group consisting of Sc, Y, Tb, Gd, and Lu, wherein A is selected from the group consisting of Al, Ga, Sc and In. Especially, A comprises aluminum (Al), however, A may also partly comprise gallium (Ga) and/or scandium (Sc) and/or indium (In), especially up to about 20% of Al, more especially up to about 10% of Al (i.e. the A ions essentially consist of 90 or more mole % of Al and 10 or less mole % of one or more of Ga, Sc and In); A may especially comprise up to about 10% gallium. In another variant, A and O may at least partly be replaced by Si and N. The element M may especially be selected from the group consisting of yttrium (Y), gadolinium (Gd), terbium (Tb) and lutetium (Lu). The term ":Ce" or ":$Ce^{3+}$", indicates that part of the metal ions (i.e. in the garnets: part of the "M" ions) in the luminescent material is replaced by Ce. For instance, assuming $(Y_{1-x}Lu_x)_3Al_5O_{12}$:Ce, part of Y and/or Lu is replaced by Ce. This notation is known to the person skilled in the art. Ce will replace M in general for not more than 10%; in general, the Ce concentration will especially be in the range of 0.1-4%, especially 0.1-2% (relative to M). Assuming 1% Ce and 10% Y, the full correct formula could be $(Y_{0.1}Lu_{0.89}Ce_{0.01})_3Al_5O_{12}$. Ce in garnets is substantially or only in the trivalent state, as known to the person skilled in the art. The term "YAG" especially refers to M=Y and A=Al; the term "LuAG" especially refers to M=Lu and A=Al. In specific embodiments, the first luminescent material comprises $M_3A_5O_{12}$:$Ce^{3+}$, wherein M is selected from the group consisting of Sc, Y, Tb, Gd, and Lu, wherein A is selected from the group consisting of Al, Ga, Sc and In, and wherein at least one or more of (i) M comprises Lu and (ii) A comprises Ga applies. By choosing Lu and/or Ga, the dominant wavelength of the luminescent material light is shifted to shorter wavelengths relative to YAG.

Hence, a specific example of a suitable first luminescent material is a luminescent material having a peak position (i.e. a peak position in the luminescent material light spectral distribution) selected from the range of 510-570 nm, especially 515-560 nm, and having a FWHM selected from the range of 100-150 nm, such as especially 110-140 nm, like about 120 nm. Especially this applies for relatively broad banded green luminescent materials, such as the cerium doped garnets.

In specific embodiments, A comprises Ga and Al. Especially then the desired spectral distribution may be obtained.

Alternatively or additionally, in embodiments the first luminescent material comprises a divalent europium comprising luminescent material, such as a divalent europium comprising silicate or a divalent europium comprising nitride, or a divalent europium comprising oxynitride, or a divalent europium comprising halide, or a divalent europium comprising oxyhalide, or a divalent europium comprising sulfide, or a divalent europium comprising oxysulfide, or a divalent europium comprising thiogallate.

In specific embodiments, the first luminescent material has a peak maximum selected from the range of 510-530 nm and a full width half maximum selected from the range of 60-80 nm. This may especially apply to the more narrow banded green luminescent materials (see also below).

In embodiments, the first luminescent material comprises one or more of $Ca_8Mg(SiO_4)_4Cl_2$:$Eu^{2+}$ and $Ca_8Zn(SiO_4)_4Cl_2$:$Eu^{2+}$ (such as described by S. Okamoto and H. Yamamoto, Electrochemical and solid-state letters, 12, (12) J112-J115 (2009)). In further embodiments, the first luminescent material comprises a β-SiAlON:$Eu^{2+}$ based green emitting phosphor, especially having the formula $Eu_x(A1)_{6-z}(A2)_z O_y N_{8-z}(A3)_{2(x+z-y)}$, where $0<z≤4.2$; $0≤y≤z$; $0<x≤0.1$; A1 is Si, C, Ge, and/or Sn; A2 comprises one or more of Al, B, Ga, and In; A3 comprises one or more of F, Cl, Br, and I. The new set of compounds described by $Eu_x(A1)_{6-z}(A2)_z O_y N_{8-z}(A3)_{2(x+z-y)}$ have the same structure as β-$Si_3N_4$. Both elements A1 and A2 reside on Si sites, and both O and N occupy the nitrogen sites of the β-$Si_3N_4$ crystal structure. A molar quantity (z−y) of the A3⁻ anion (defined as a halogen) reside on nitrogen sites. See further e.g.: Synthesis and Photoluminescence Properties of β-sialon:$Eu^{2+}$ ($Si_{6-z}Al_z O_z N_{8-z}$:$Eu^{2+}$), A Promising Green Oxynitride Phosphor for White Light-Emitting Diodes, R.-J. Xiez, N. Hirosaki, H.-L. Li, Y. Q. Li and M. Mitomo, J. Electrochem. Soc. 2007 volume 154, issue 10, J314-J319.

A specific example of a suitable first luminescent material is a luminescent material having a peak position (i.e. a peak position in the luminescent material light spectral distribution) selected from the range of 510-530 nm, especially 515-525 nm, and having a FWHM selected from the range of 50-90 nm, such as especially 60-80 nm, like about 70 nm. Especially this applies for relatively narrow banded green luminescent materials.

Further, as indicated above the lighting device especially comprises a second luminescent material configured to convert part of one or more of the blue light and the first luminescent material light into second luminescent material light having intensity in one or more of the orange and red. The second luminescent material may provide also light intensity in other spectral regions upon excitation by the light source. Especially however, the spectral distribution of the second luminescent material light is especially in the orange and/or red, even more especially in the red. As indicated above, the term "second luminescent material" may also refer to a plurality of different luminescent materials, having different spectral distributions contributing to the second luminescent material light. Especially, the second luminescent material is configured to provide a spectral distribution with at least 80% of the power in the spectral region of 570-760 nm in the range of 585-720 nm.

In embodiments, the second luminescent material may comprise one or more materials selected from the group consisting of $(Ba,Sr,Ca)S:Eu$, $(Ba,Sr,Ca)AlSiN_3:Eu$ and $(Ba,Sr,Ca)_2Si_5N_8:Eu$. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3:Eu$, the correct formula could be $(Ca_{0.98}Eu_{0.02})AlSiN_3$. Divalent europium will in general replace divalent cations, such as the above divalent alkaline earth cations, especially Ca, Sr or Ba.

The material $(Ba,Sr,Ca)S:Eu$ can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Further, the material $(Ba,Sr,Ca)_2Si_5N_8:Eu$ can also be indicated as $M_2Si_5N_8:Eu$, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8:Eu$ (i.e. 75% Ba; 25% Sr). Here, Eu is introduced and replaces at least part of M, i.e. one or more of Ba, Sr, and Ca).

Likewise, the material $(Ba,Sr,Ca)AlSiN_3:Eu$ can also be indicated as $MAlSiN_3:Eu$, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

In specific embodiments, the second luminescent material comprises $MAlSiN_3:Eu$, wherein M is one or more elements selected from the group consisting of barium (Ba), strontium (Sr) and calcium (Ca), especially one or more of Sr and Ca. In an embodiment, the second luminescent material comprises $CaAlSiN_3:Eu$ ("eCAS") and in another embodiment, the second luminescent material comprises $SrAlSiN_3:Eu$ (eSCAS). The latter is blue shifted by up to about 30 nm relative to the former. Especially, these type of luminescent materials may provide the desired optical properties together with the first luminescent materials and the light source. In further specific embodiments, the second luminescent material comprises different $MAlSiN_3:Eu$ compounds, with a first compound with M at least comprising Ca and a second compound with M at least comprising Sr. Hence, in such first compound M may predominantly, such as at least 50%, even more especially at least 90%, comprise Ca, and in such second compound M may predominantly, such as at least 50%, even more especially at least 90%, comprise Sr. Part of M is replaced by Eu, such as about 0.1-4%.

A specific example of a suitable second luminescent material is a luminescent material having a peak position (i.e. a peak position in the luminescent material light spectral distribution) selected from the range of 610-680 nm, especially 616-650 nm, and having a FWHM selected from the range of 60-150 nm, such as especially 60-130 nm, like about 80-120 nm.

In specific embodiments, the second luminescent material comprises a first second luminescent material having a first second peak maximum selected from the range of 610-640 and a full width half maximum selected from the range of 60-110 nm and a second luminescent material having a second luminescent material peak maximum selected from the range of 630-680 nm and having a full width half maximum selected from the range of 60-130 nm, and wherein the first second peak maximum and the second peak maximum differ with at least 10 nm, such as in the range of 15-40 nm. The first second luminescent material may be slightly more orange than the second luminescent material, and the second luminescent material may (thus) be slightly redder than the first second luminescent material.

Especially good results may be obtained when the second luminescent material comprises $MAlSiN_3:Eu$, wherein M comprises one or more elements selected from the group consisting of barium (Ba), strontium (Sr) and calcium (Ca), wherein the second luminescent material comprises (at least two) different $MAlSiN_3:Eu$ compounds, with a first compound with M at least comprising Ca and a second compound with M at least comprising Sr.

Hence, the lighting device comprise the first luminescent material and/or the second luminescent material, especially at least both the first luminescent material and the second luminescent material, which are radiatively coupled to the light source. The first luminescent material is especially configured to provide first luminescent material light with a dominant wavelength in the green, yellow, or optionally orange. The second luminescent material is especially configured to provide second luminescent material light with a dominant wavelength in the red. Hence, the first luminescent material and the second luminescent material are different luminescent materials. Of course, the lighting device may comprise further luminescent materials.

Therefore, in specific embodiments of the light emitting device:

the solid state light source is configured to provide blue light having a peak wavelength ($\lambda_{PWL}$) selected from the range of 430-490 nm, especially 440-480 nm;

the solid state light source has a LED die, wherein the lighting device comprises a light converter comprising said first luminescent material and said second luminescent material, and wherein the light converter is in physical contact with the LED die;

the first luminescent material comprises $M_3A_5O_{12}:Ce^{3+}$, wherein M is selected from the group consisting of Sc, Y, Tb, Gd, and Lu, wherein A is selected from the group consisting of Al, Ga, Sc and In, and wherein A comprises Ga and Al;

the second luminescent material comprises $MAlSiN_3:Eu$, wherein M comprises one or more elements selected from the group consisting of barium (Ba), strontium (Sr) and calcium (Ca), wherein the second luminescent material comprises different $MAlSiN_3:Eu$ compounds, with a first compound with M at least comprising Ca and a second compound with M at least comprising Sr; and The luminescent material(s) may be provided as such, such as a coating of the luminescent material predominantly or even entirely consisting of the luminescent material(s), or may be embedded in a matrix, such as a silicone matrix or a PMMA matrix. Combinations of these embodiments may also be possible. The different luminescent materials may be provided in different ways, and may e.g. be provided in different matrix layers or in different matrices.

In specific embodiments, the solid state light source has a LED die, wherein the lighting device comprises a light converter comprising said first luminescent material and said second luminescent material, and wherein the light converter is in physical contact with the LED die. Note that optionally the light converter may only comprise one of the luminescent materials. Further, the term "light converter" may also refer to a plurality of (different) light converters. Yet further, when a plurality of light sources are applied, one or more light sources may radiationally coupled to one or more light converters including substantially only the first luminescent material and one or more light sources may radiationally coupled to one or more light converters including substantially only the second luminescent material. The light converter may comprise a garnet material, or a polymer material, like a resin, or PMMA or siloxane polymer, etcetera. The light converter is transmissive for the light source light and the luminescent material light. In yet further embodiments, which may be combined with one or more of the preceding embodiments, the light converter is not in physical contact with the light source, but is configured at some distance from the LED die, such as 0.5-100 mm from the LED die.

The lighting device is especially configured to provide white light (at a first setting). Hence, especially the lighting device is configured to provide at said first setting of the lighting device white lighting device light. The phrase "at a first setting of the lighting device" indicates that the lighting device at least includes a single setting such as "on". Hence, the invention also provides lighting devices which have (substantially) no tunability in intensity except for "on" and "off". A plurality of settings may especially be available when there is more than one light source. When a plurality of setting is possible, at least one setting may provide white light. Other settings may provide white light with a different color temperature or colored light, etcetera.

Hence, a plurality of settings may especially be provided when the lighting device further comprises a control system, configured to control the lighting device light (by controlling the light source(s). Therefore, in yet a further embodiment the light emitting device may further comprise a control system configured to control the power provided to the (one or more) (solid state) light sources. Alternatively or additionally, the control system may be (configured) external from the light emitting device. Optionally, the control system may comprise a plurality of elements, of which some may be comprised by the light emitting device and others may be external from the light emitting device (such as a remote user interface, see also below). The light emitting device may e.g. be integrated in a lighting system with a plurality of light emitting devices and optional other type of light emitting devices than described herein.

In yet a further specific embodiment, the control system is configured to control the power provided to the one or more (solid state) light sources as function of an input signal of a user interface. This user interface may be integrated in the light emitting device, but may also be remote from the light emitting device. Hence, the user interface may in embodiments be integrated in the light emitting device but may in other embodiments be separate from the light emitting device. The user interface may e.g. be a graphical user interface. Further, the user interface may be provided by an App for a Smartphone or other type of android device. Therefore, the invention also provides a computer program product, optionally implemented on a record carrier (storage medium), which when run on a computer executes the method as described herein (see below) and/or can control (the color temperature of the light emitting device light of) the light emitting device as described herein (as function of the power provided to the one or more (solid state) light sources).

Alternatively or additionally, the control system is configured to control the power provided to the one or more (solid state) light sources as function of one or more of a sensor signal and a timer. To this end, e.g. a timer and/or a sensor may be used. For instance, the timer may be used to switch off after a predetermined time. Further, for instance the sensor may be a motion sensor, configured to sense motion, with the control system configured to switch on the light emitting device when the motion sensor senses motion or presence of e.g. a person. Further, the sensor may be an optical sensor, e.g. to sense the light, especially the light emitting device light, reflected by a product (illuminated with the light emitting device light).

Hence, in a further aspect the invention also provides a lighting system comprising the light emitting device as defined herein and a control system configured to control the light emitting device. As indicated above, the control system may also be comprised by the lighting device. The lighting system may especially comprise a control system configured to control the lighting device and one or more other devices, such as a plurality of the lighting devices as described herein and optionally also other lighting devices. The control system may control the lighting device(s) as function of one or more of a sensor signal and a timer (see also above).

As indicated above, the person skilled in the art knows how to select luminescent materials from a library with luminescent materials data to provide the desired optical properties.

Yet more especially, the solid state light source is configured to provide blue light having a peak wavelength selected from the range of 430-490 nm, especially 440-480 nm, such as about 450-470 nm, wherein the first luminescent material comprise $M_3(Al,Ga)_5O_{12}:Ce$, and wherein the second luminescent material comprises (at least two luminescent materials, respectively comprising) $CaAlSiN_3:Eu$ and $SrAlSiN_3:Eu$, wherein M is as defined above, and wherein especially A comprises both Al and Ga.

Some suitable materials are indicated below (in the first table), which may be, when combined in the right ratios and radiatively coupled with a blue light source, provide in operation white lighting device light with the herein described desired properties:

|  | CIE x | CIE y | CIE ' | CIE v' | Emission max | Excitation max |
| --- | --- | --- | --- | --- | --- | --- |
| Green (first luminescent material) | 0.3597 | 0.5558 | 0.1608 | 0.5589 | 525 nm | 441 nm |
| orange (red) (second luminescent material) | 0.6031 | 0.3959 | 0.3686 | 0.5444 | 610 nm | <400 nm |
| Red (second luminescent material) | 0.6452 | 0.3535 | 0.4336 | 0.5346 | 642 nm | <400 nm |
| alternative green (alternative first luminescent material) | 0.3664 | 0.5580 | 0.1635 | 0.5603 | 530 nm | 445 nm |

In embodiments, to obtain the desired spectral distribution one or more light sources and one or more luminescent materials are applied, but no optical filters are applied to further modify the relative intensities of the spectral distribution. Hence, in specific embodiments the lighting device does not include optical filters. Especially, at least in embodiments no optical filters are available that absorb at one or more wavelengths in the visible. Especially, no optical components downstream of the luminescent material are configured that have a transmission of less than 900%, such as less than 95%, at one or more wavelengths in the visible.

The terms "violet light" or "violet emission" especially relates to light having a wavelength in the range of about 380-440 nm. The terms "blue light" or "blue emission" especially relate to light having a wavelength in the range of about 440-495 nm (including some violet and cyan hues). The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The terms "red light" or "red emission" especially relate to light having a wavelength in the range of about 620-780 nm. The term "pink light" or "pink emission" refers to light having a blue and a red component. The terms "visible", "visible light" or "visible emission" refer to light having a wavelength in the range of about 380-780 nm.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

Figure 1:
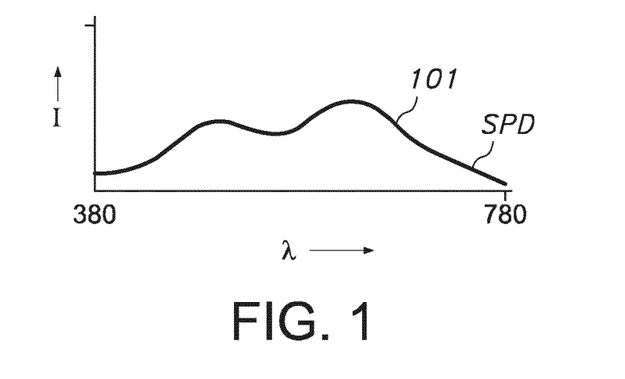
FIG. 1 schematically depict an embodiment of the process for evaluation the cheese damage function value.

FIG. 1 schematically depicts an example of a spectral power distribution (SPD) of lighting device light (101). This spectrum is multiplied with the herein described cheese damage function DF, and the thus obtained plot is integrated over the wavelength range 380-780 nm and corrected with the normalization factor k as defined herein. In this way the cheese damage function value (CDFV) is obtained, which should be at maximum 2 for a lighting device suitable for cheese lighting.

Figure 2:
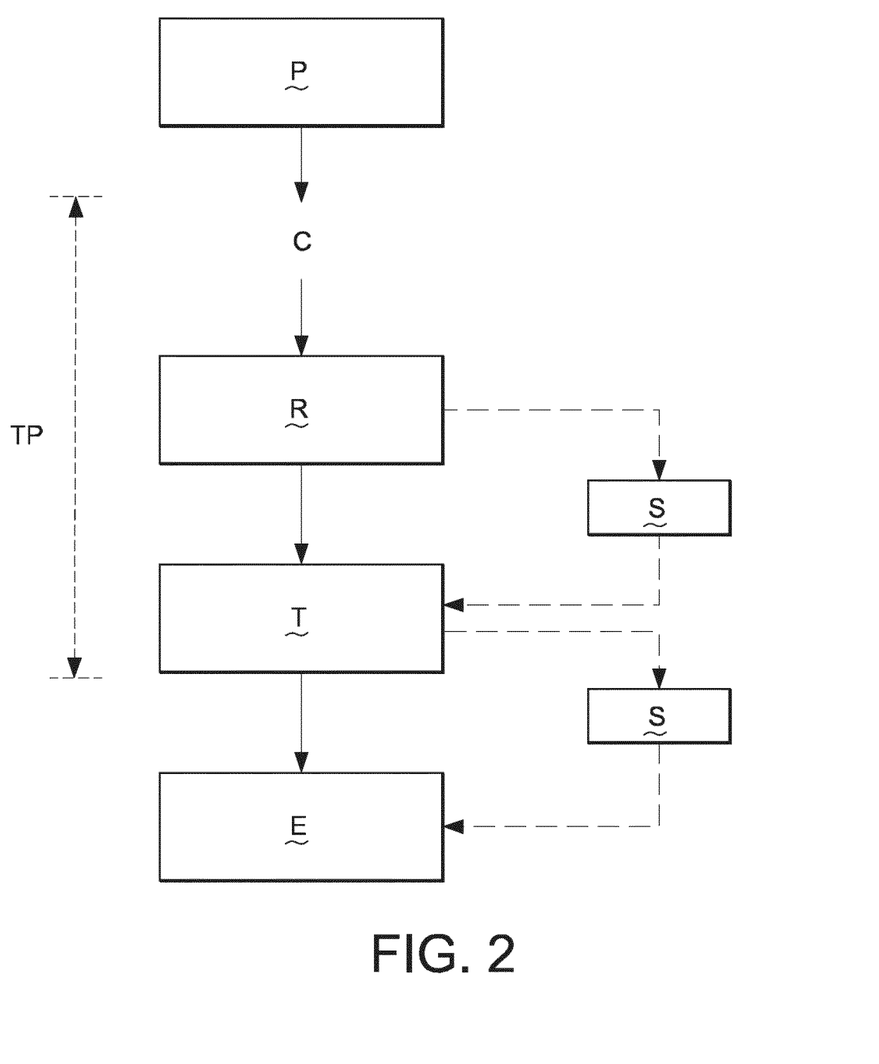
FIG. 2 schematically depicts some stages of the lifetime of a cheese.

FIG. 2 very schematically depicts some (possible) stages of the lifetime of a cheese. The stages especially include the production stage P, which in general provides a curd C. Herein, especially hard or semi-hard cheeses are of interest. However, other cheese may also be of interest. When the curd C has been provided, this curd may be indicated as cheese. In general, however, there will be a ripening stage R to provide a cheese that can commercially be used. Ripening and an optional storage may be a single stage. However, ripening and an optional storage may also include different stages, such as at different positions within a cheese making plant. A storage stage is indicated with S, which may optionally be available between the ripening stage and a transport stage T. In general, the transport stage will be included in the lifetime, as in general the cheese is not sold at the cheese making plant, but e.g. in a shop, such as a supermarket. In the supermarket, or other place, the cheese may be exposed or exhibited, indicated with stage E. This may be an exposure to end user by arranging cheeses in e.g. a refrigerated display equipment (see also FIG. 4b). In embodiments, after the transport stage T but before the exposure stage E, there may be an optional storage stage S. Reference indicates the time period in which the cheese is especially subjected to the dark or to the lighting complying with the cheese damage function value (CDFV) as defined herein ("cheese light"). In embodiments, during at least 80% of a time period from production until and including transport of the cheese 1, in FIG. 2 indicated with TP, the cheese 1 is subjected to the substantial absence of light or to illumination with lighting device light complying with the condition of the cheese damage function value (CDFV) as defined herein. In embodiments, the time period may be extended to include one or more of a storage stage and the exposure stage. Especially when such storage is included, the cheese 1 is subjected to the substantial absence of light or to illumination with lighting device light complying with the condition of the cheese damage function value (CDFV)

as defined herein. The herein described cheese logistics method may also include only a subset of the in FIG. 2 displayed stages and/or include other stage. Further, during one or more of the stage the cheese may be subjected to the conditions of substantially no lighting or substantially only illumination with the herein described cheese light.

Figure 3:
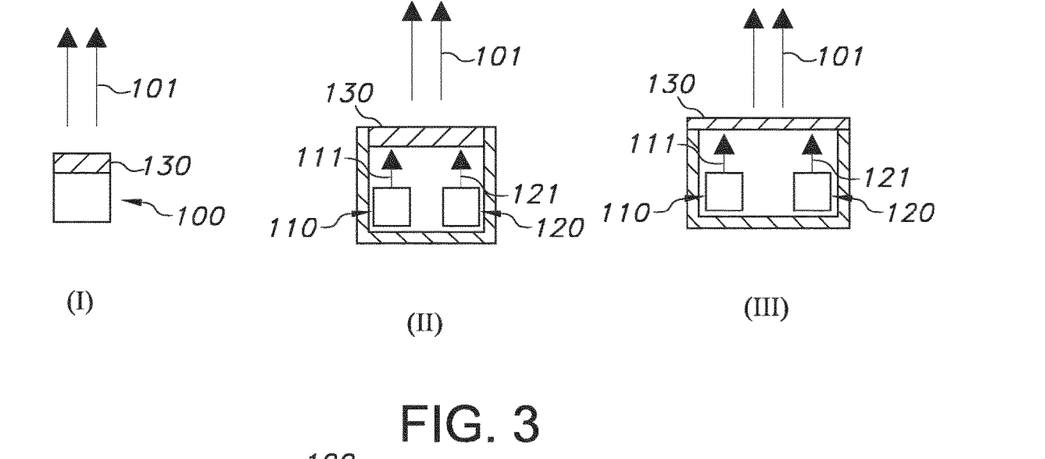
FIG. 3 schematically depict some embodiments of lighting devices.

FIG. 3 very schematically depicts three types of lighting devices 100 that may be used, such as a solid state light source, especially a LED, with an optical element 130, here especially comprising one or more luminescent materials that is (are) configured to convert at least part of the light of the solid state light source light into luminescent material light, thereby providing lighting device light 101 complying with the cheese damage function value (CDFV) as defined herein, see example (I). Light with the desired properties is provided downstream of the optical element 130. The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

In example (II), a plurality of solid state light sources, especially a LEDs, with an optical element 130, here especially comprising one or more luminescent materials that is (are) configured to convert at least part of the light of the solid state light source light into luminescent material light, thereby providing lighting device light 101 complying with the cheese damage function value (CDFV) as defined herein. Of course, one or both of the light sources 110, 120 may also include a luminescent material.

In example (III), a plurality of solid state light sources, especially a LEDs, with an optical element 130, here especially a light transmissive window are configured to provide lighting device light 101 complying with the cheese damage function value (CDFV) as defined herein.

Figure 4A:
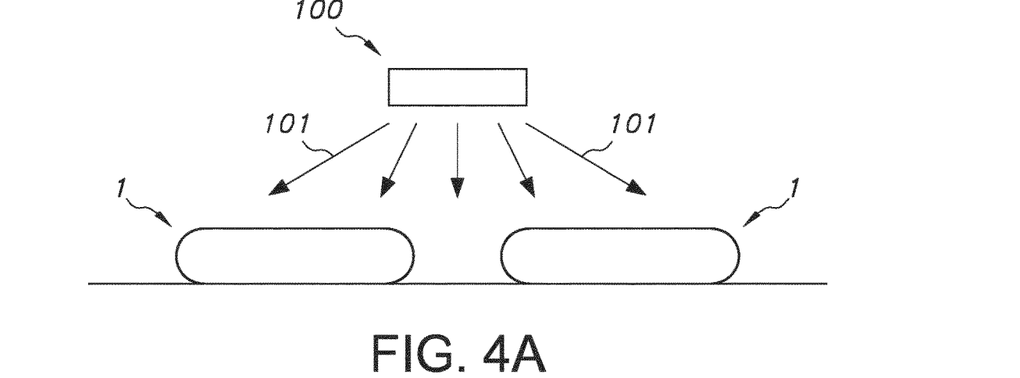
FIGS. 4a-4b schematically depict some aspects of the invention.

FIG. 4a schematically depicts lighting of a cheese 1, by illuminating the cheese 1 with lighting device light 101. For instance, the cheese(s) may be configured on a shelf. The cheese may e.g. be a Gouda, Edam, Tilsit, Gruyere, Cheddar, Emmental or Maasdam cheese.

Figure 4B:
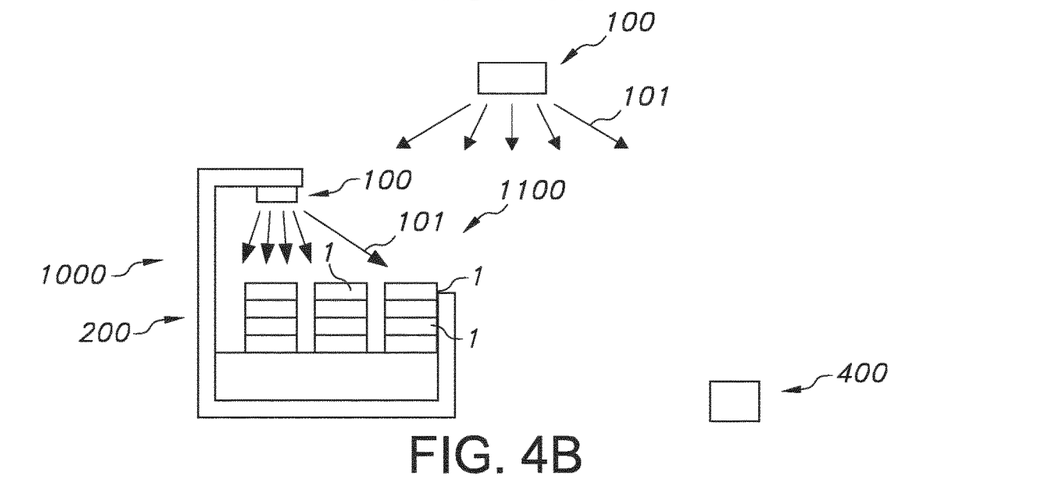

FIG. 4b schematically depicts an embodiment of a system 1000 comprising (i) a refrigerated display equipment 200 comprising a display part 1100 for displaying cheese 1, such as by way of example a packaged cheese, though the cheese may also be unpackaged, and (ii) a lighting device 100 as defined herein, configured to illuminate the display part 1100. However, the invention is not limited to illumination of the cheese 1 in such refrigerated display equipment.

Figure 5A:
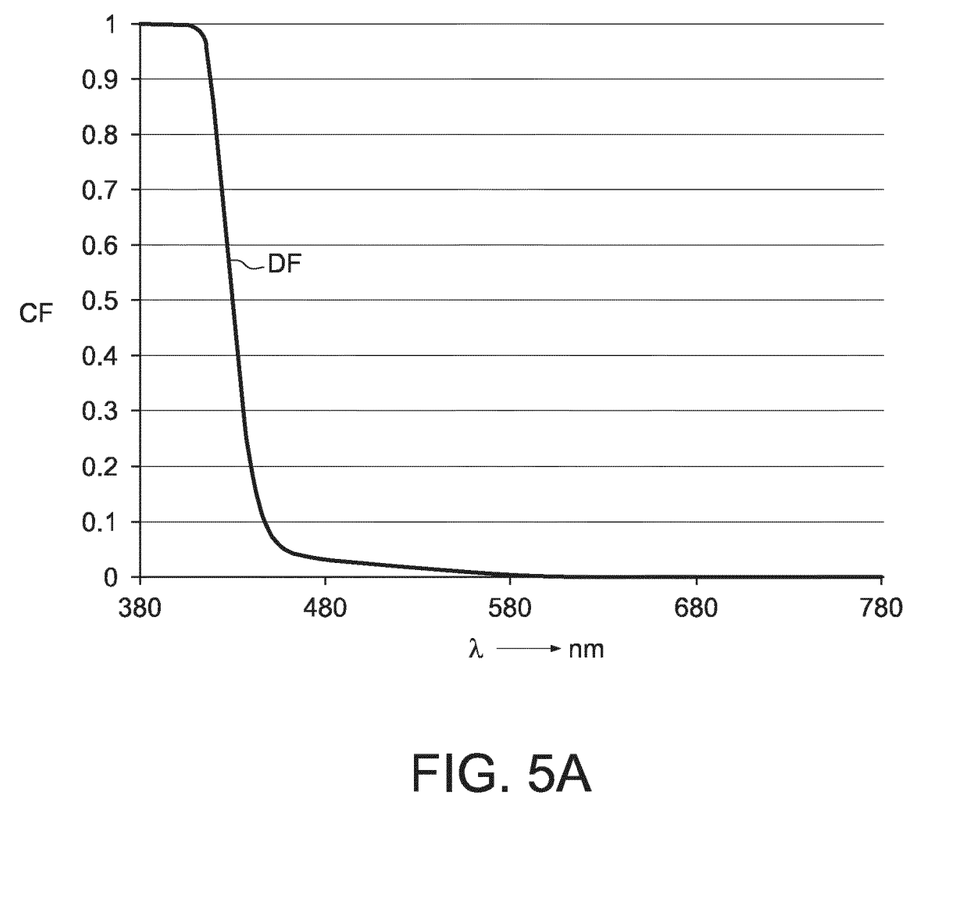
FIGS. 5a-5d depict some plots, including spectral power distributions in relation to the invention.

FIG. 5a depicts the cheese damage function DF in the spectral range of 380-780 nm. CF indicates the correction factor, which is 1 for the wavelength range of 380-410 nm.

Figure 5B:
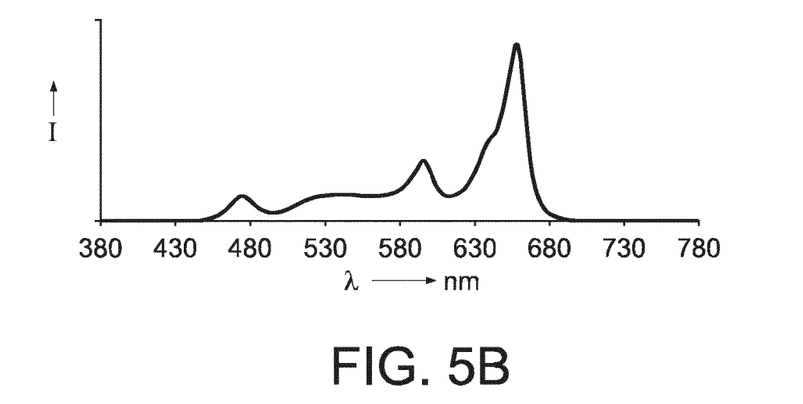

FIG. 5b depicts a spectral power distribution of light of a lighting device complying with a CDFV of 2 or lower (here 1.6). The lighting device light has emission bands in the range of 430-490 nm, 510-570 nm, 580-605 nm, and 610-680 nm.

Figure 5C:
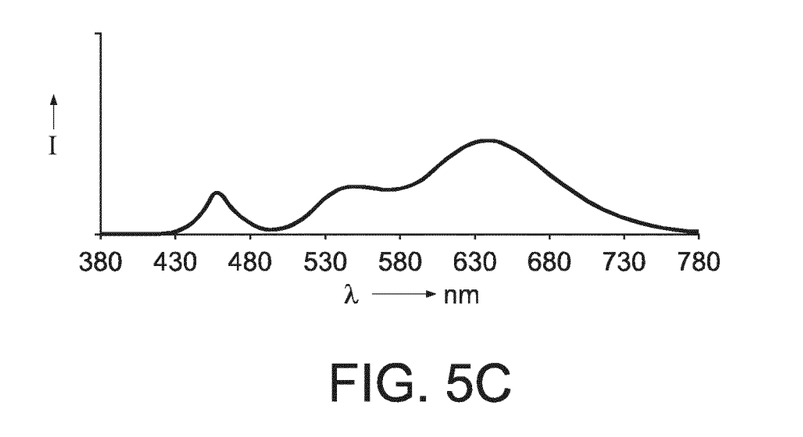

FIG. 5c depicts a spectral power distribution of light of a device not complying with a CDFV of 2 or lower (here 2.8). Hence, such light/lighting device is not suitable for lighting of cheese and may detrimentally affect color and/or taste.

Figure 5D:
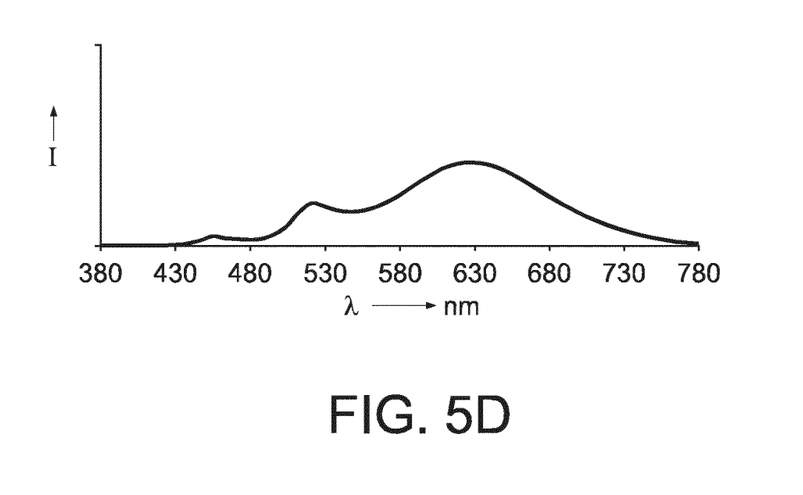

FIG. 5d depicts a spectral power distribution of light of a lighting device complying with a CDFV of 2 or lower (here also 1.6).) The light has emission maxima in the range of 440-480 nm, 510-540 nm, and 610-650 nm: three bands with maxima at about 450 nm+/−10 nm, 520 nm+/−10 nm, and 620 nm+/−10 nm.

This invention gives insights of the influence of spectrum and storage conditions on the deterioration of cheese due to lipid oxidation. The effect of the spectrum of several lighting devices on the lipid oxidation in cheese is compared to that of conventional white sodium discharge lamp. The level of lipid oxidation is monitored by measuring the amount of malondialdehyde and the color change in time. Malondialdehyde is a well-known and accepted marker for lipid oxidation and is measured with a so-called TBARS assay method. A method described by Oxford Biomedical Research, Inc. was followed (Food TBARS assay kit, catalogue number FS50).

It was found that most malondialdehyde is formed using the conventional white sodium discharge lamp while some other lamps (see also FIGS. 5b and 5d) cause significantly less lipid oxidation in cheese.

Interestingly, it was also found that when cheese was exposed to light and subsequently stored in the dark, lipid oxidation continues (albeit at lower speed compared to the situation when the cheese would have remained under the lamp). This effect is stronger for initial exposure to white sodium discharge lamp compared to some of the other lighting devices (including those generating spectra similar to those of FIGS. 5b and 5d). This means that the light conditions used in a supermarket are determinative factors how fast the deterioration of the cheese occurs, also when stored at home in the refrigerator of the consumer. This might also be relevant for the food industry: using optimal spectra in areas where cheese is exposed to light, might be beneficial for the final product quality. Cheese that is stored in the dark does not change color. Based on the results of the effect of the specific wavelength areas on both lipid oxidation and color of the cheese, the cheese damage function is calculated.

A plurality of systems was tested, see table 1:

TABLE 1

| | spectral distributions tested | | | | | | |
|---|---|---|---|---|---|---|---|
| | 1 | 2 | 3 | 4 | 5 | 6 | 7 |
| x | 0.5253 | 0.5375 | 0.5192 | 0.4999 | 0.5090 | 0.4895 | 0.4926 |
| y | 0.4124 | 0.4297 | 0.4042 | 0.4227 | 0.4371 | 0.4069 | 0.4264 |
| u' | 0.3046 | 0.3036 | 0.3048 | 0.2827 | 0.2817 | 0.2836 | 0.2763 |
| v' | 0.5381 | 0.5461 | 0.5340 | 0.5379 | 0.5443 | 0.5305 | 0.5381 |
| CCT [K] | 2006 | 2008 | 2006 | 2306 | 2310 | 2307 | 2410 |
| DF | 2.3 | 1.6 | 2.5 | 2.7 | 2.0 | 2.9 | 2.8 |

TABLE 1-continued

| | spectral distributions tested | | | | | | |
|---|---|---|---|---|---|---|---|
| | 8 | 9 | 10 | 11 | 12 | 13 | 14 |
| x | 0.4987 | 0.4810 | 0.4887 | 0.4536 | 0.4667 | 0.4578 | 0.4707 |
| Y | 0.4348 | 0.4075 | 0.4201 | 0.4006 | 0.4249 | 0.4080 | 0.4311 |
| u' | 0.2762 | 0.2777 | 0.2767 | 0.2630 | 0.2605 | 0.2623 | 0.2603 |
| v' | 0.5420 | 0.5294 | 0.5352 | 0.5225 | 0.5337 | 0.5261 | 0.5365 |
| CCT [K] | 2402 | 2407 | 2409 | 2710 | 2715 | 2709 | 2708 |
| DF | 2.1 | 3.2 | 3.0 | 3.8 | 3.3 | 3.5 | 2.4 |

FIG. 6 shows one of the best spectral distributions in terms of damage function and optical properties. This spectral distribution did not provide the lowest possible cheese damage function, but still relatively low, but including very suitable optical properties in terms of perception like CRI, color temperature, etc. In table below, the intensities (energy scale, normalized to 1) in step of 10 nm are indicated.

TABLE 2 example of suitable spectral distribution

| wavelength [nm] | I |
|---|---|
| 380 | 0.004921423 |
| 390 | 0.002315964 |
| 400 | 0.002067825 |
| 410 | 0.004177006 |
| 420 | 0.015012407 |
| 430 | 0.043300248 |
| 440 | 0.101364764 |
| 450 | 0.245740281 |
| 460 | 0.358850289 |
| 470 | 0.287096774 |
| 480 | 0.239123242 |
| 490 | 0.242555831 |
| 500 | 0.273614557 |
| 510 | 0.315880893 |
| 520 | 0.360545906 |
| 530 | 0.417535153 |
| 540 | 0.490529363 |
| 550 | 0.579859388 |
| 560 | 0.679983457 |
| 570 | 0.784284533 |
| 580 | 0.878163772 |
| 590 | 0.944417 |
| 600 | 0.989661 |
| 610 | 0.993383 |
| 620 | 0.959264 |
| 630 | 0.891646 |
| 640 | 0.797353 |
| 650 | 0.69603 |
| 660 | 0.588875 |
| 670 | 0.488048 |
| 680 | 0.3933 |
| 690 | 0.31493 |
| 700 | 0.249132 |
| 710 | 0.193714 |
| 720 | 0.150207 |
| 730 | 0.114433 |
| 740 | 0.087717 |
| 750 | 0.066088 |
| 760 | 0.050248 |
| 770 | 0.037097 |
| 780 | 0.028908 |

Spectral distributions other than as indicated above in the table/FIG. 6 may also be possible.

FIG. 6 shows a spectral distribution with a cheese damage function of below 2, a CRI of 84, a CCT of 2652, a color point of x=0.4656, y=0.4146.

As can be seen in FIG. 6, the spectral distribution of the essentially consists of two main bands, with a shoulder at the low energy flank on the first emission band, providing intensity in the entire spectral region of 440-740 nm, with a first emission band having a first maximum in the range of 450-470 nm, a local minimum in the spectral range of 470-500 nm, and a second emission band having second maximum in the range of 600-620 nm, wherein the first maximum has a peak height of less than 50% and more than 20% of a peak height of the second maximum, wherein the second band has a bandwidth (FWHM) in the range of 100-170 nm, and wherein the local minimum has a minimum intensity in the range of 50-90% of the first maximum. Of course, the local minimum has a larger wavelength than the first maximum. In FIG. 6, the first emission band has a first maximum at about 458 nm, the local minimum is at about 482 nm, and the second emission band has a second maximum at about 608 nm. The full width at half maximum (FWHM) is about 126 nm.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A method of selecting the suitability of a lighting device for use in cheese lighting, the method comprising (a) defining a normalization factor for a spectral power distribution (SPD($\lambda$)) of lighting device light of said lighting device in a wavelength range of 380-780 nm, (b) defining the lighting device suitable for use in cheese lighting when a cheese damage function value (CDFV) is equal to or below 2, wherein the cheese damage function value (CDFV) is defined as:

$$CDFV = k \times \sum_{\lambda} SPD(\lambda) \cdot DF(\lambda) \cdot \Delta\lambda$$

wherein:

$$k = \frac{100}{\sum_{\lambda} SPD(\lambda) \cdot \overline{y}(\lambda) \cdot \Delta\lambda}$$

wherein $\overline{y}(\lambda)$ is the 2-degree color matching function, and wherein DF($\lambda$)=1 for 380 nm$\leq\lambda$<410, and wherein for 410$\leq\lambda\leq$780:

$$DF(\lambda) = 0.95 \times e^{-\left(\frac{\lambda-410}{22}\right)^2} + 0.05 \times e^{-\left(\frac{\lambda-410}{105}\right)^2}.$$

2. The method according to claim 1, defining the lighting device suitable for use in cheese lighting when the lighting device light also has a correlated color temperature (CCT) of at least 2400 K.

3. A method of lighting cheese, the method comprising illuminating said cheese with lighting device light having a cheese damage function value (CDFV) as defined in claim 1 of equal to or below 2,
wherein the lighting device light has a spectral power distribution with a at least two main bands providing intensity in the entire spectral region of 440-740 nm, with a first emission band having a first maximum in the range of 450-470 nm, a local minimum in the spectral range of 470-500 nm, and a second emission band having second maximum in the range of 600-620 nm, wherein the first maximum has a peak height of less than 50% and more than 20% of a peak height of the second maximum, wherein the second band has a bandwidth in the range of 100-170 nm, and wherein the local minimum has a minimum intensity in the range of 50-90% of the first maximum.

4. The method according to claim 3, wherein at least 80% of a total energy provided as visible light to said cheese consists of said lighting device light, and wherein the cheese is selected from the group selected from the group consisting of Gouda, Edam, Tilsit, Gruyere, Cheddar, Emmental and Maasdam.

5. The method according to claim 3, the method comprising illuminating said cheese with said lighting device light while the cheese is contained in a refrigerated display equipment.

6. A cheese logistics method comprising (a) providing said cheese and (b) transport of the cheese, the method comprising subjecting the cheese during at least 80% of a time period from production of said cheese until and including transport of said cheese to the substantial absence of light or to illumination with lighting device light having a cheese damage function value (CDFV) as defined in claim 1 of equal to or below 2,
wherein the lighting device light has a spectral power distribution with a at least two main bands providing intensity in the entire spectral region of 440-740 nm, with a first emission band having a first maximum in the range of 450-470 nm, a local minimum in the spectral range of 470-500 nm, and a second emission band having second maximum in the range of 600-620 nm, wherein the first maximum has a peak height of less than 50% and more than 20% of a peak height of the second maximum, wherein the second band has a bandwidth in the range of 100-170 nm, and wherein the local minimum has a minimum intensity in the range of 50-90% of the first maximum.

7. The method according to claim 6, wherein the time period also includes one or more of (a) a ripening stage of the cheese, (b) a storage stage of the cheese, and (c) processing of said cheese.

8. The method according to claim 6, the method comprising illuminating said cheese with said lighting device light while the cheese is contained in a refrigerated display equipment.

9. The method according to claim 6, wherein the cheese is provided as packaged cheese.

10. A lighting device configured to provide lighting device light having a cheese damage function value (CDFV) is equal to or below 2, wherein the cheese damage function value (CDFV) is obtained by (a) defining a normalization factor (k) for a spectral power distribution (SPD($\lambda$)) of lighting device light of said lighting device in a wavelength range of 380-780 nm, (b) defining the lighting device suitable for use in cheese lighting when a cheese damage function value (CDFV) is equal to or below 2, wherein the cheese damage function value (CDFV) is defined as:

$$CDFV = k \times \sum_{\lambda} SPD(\lambda) \cdot DF(\lambda) \cdot \Delta\lambda$$

wherein:

$$k = \frac{100}{\sum_\lambda SPD(\lambda) \cdot \overline{y}(\lambda) \cdot \Delta\lambda}$$

wherein $\overline{y}(\lambda)$ is a 2-degree color matching function, and wherein $DF(\lambda)=1$ for 380 nm$\leq\lambda<410$, and wherein for $410\leq\lambda\leq780$:

$$DF(\lambda) = 0.95 \times e^{-\left(\frac{\lambda-410}{22}\right)^2} + 0.05 \times e^{-\left(\frac{\lambda-410}{105}\right)^2},$$

wherein the lighting device light has a spectral power distribution with a at least two main bands providing intensity in the entire spectral region of 440-740 nm, with a first emission band having a first maximum in the range of 450-470 nm, a local minimum in the spectral range of 470-500 nm, and a second emission band having second maximum in the range of 600-620 nm, wherein the first maximum has a peak height of less than 50% and more than 20% of a peak height of the second maximum, wherein the second band has a bandwidth in the range of 100-170 nm, wherein the local minimum has a minimum intensity in the range of 50-90% of the first maximum.

11. The lighting device according to claim 10, wherein the lighting device is configured to provide lighting device light having a correlated color temperature (CCT) selected from the range of 2200-3000 K, and a general color rendering index ($R_a$) of at least 90.

12. The lighting device according to claim 10, comprising a first light source configured to provide first light source light having a correlated color temperature (CCT) selected from the range of 1800-2200 K, and a second light source configured to provide second light source light having a dominant wavelength in the green spectral region.

13. The lighting device according to claim 10, wherein the lighting device light further having a color rendering index ($R_a$) of at least 80, a correlated color temperature selected from the range of 2500-2800 K, and a color point of x=0.4656±0.05, y=0.4146±0.05.

14. The lighting device according to claim 10, wherein the lighting device light has a spectral distribution, when normalized to 1, as defined in FIG. 6 or deviates in intensity thereof with at maximum 5% of the highest intensity.

15. A system comprising (i) a refrigerated display equipment comprising a display part for displaying cheese (1) and (ii) a lighting device according to claim 10 configured to illuminate the display part.

* * * * *